June 4, 1968  H. S. MAXWELL  3,386,321
AUTOMATIC CONTROL SYSTEM FOR HOT STRIP MILL CROP SHEAR
Filed April 22, 1965  3 Sheets-Sheet 1

INVENTOR.
HUGH S. MAXWELL
BY
ATTORNEY

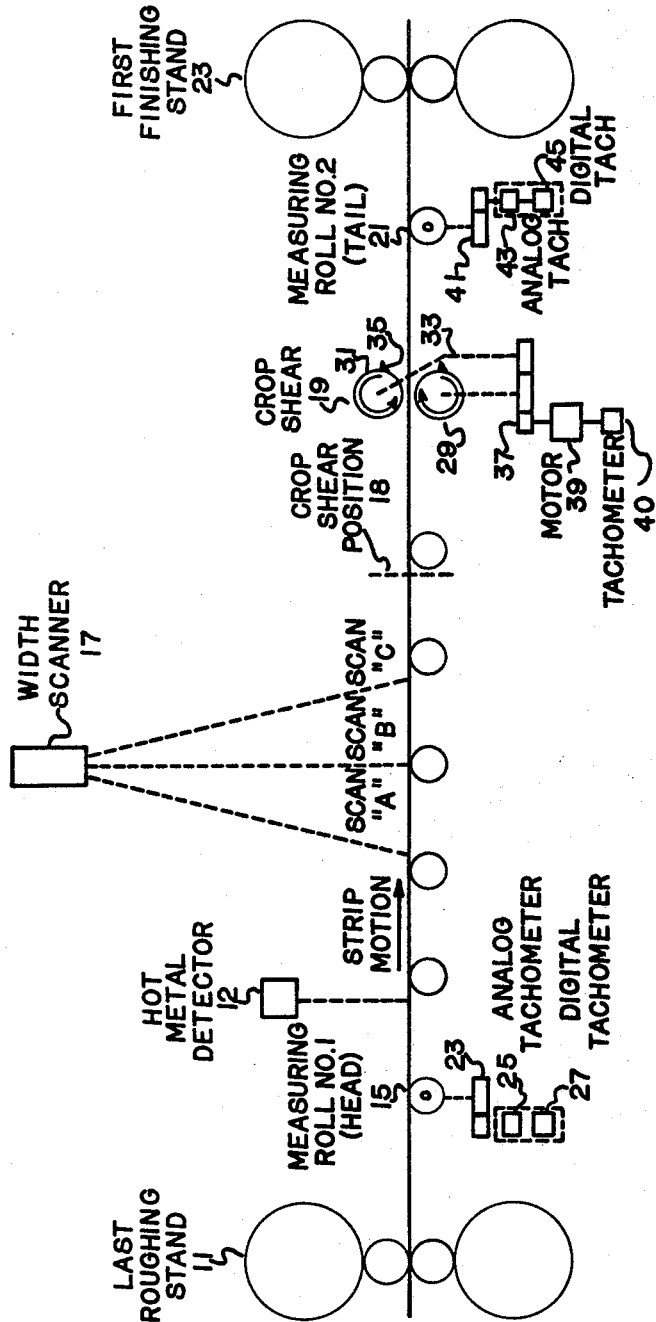

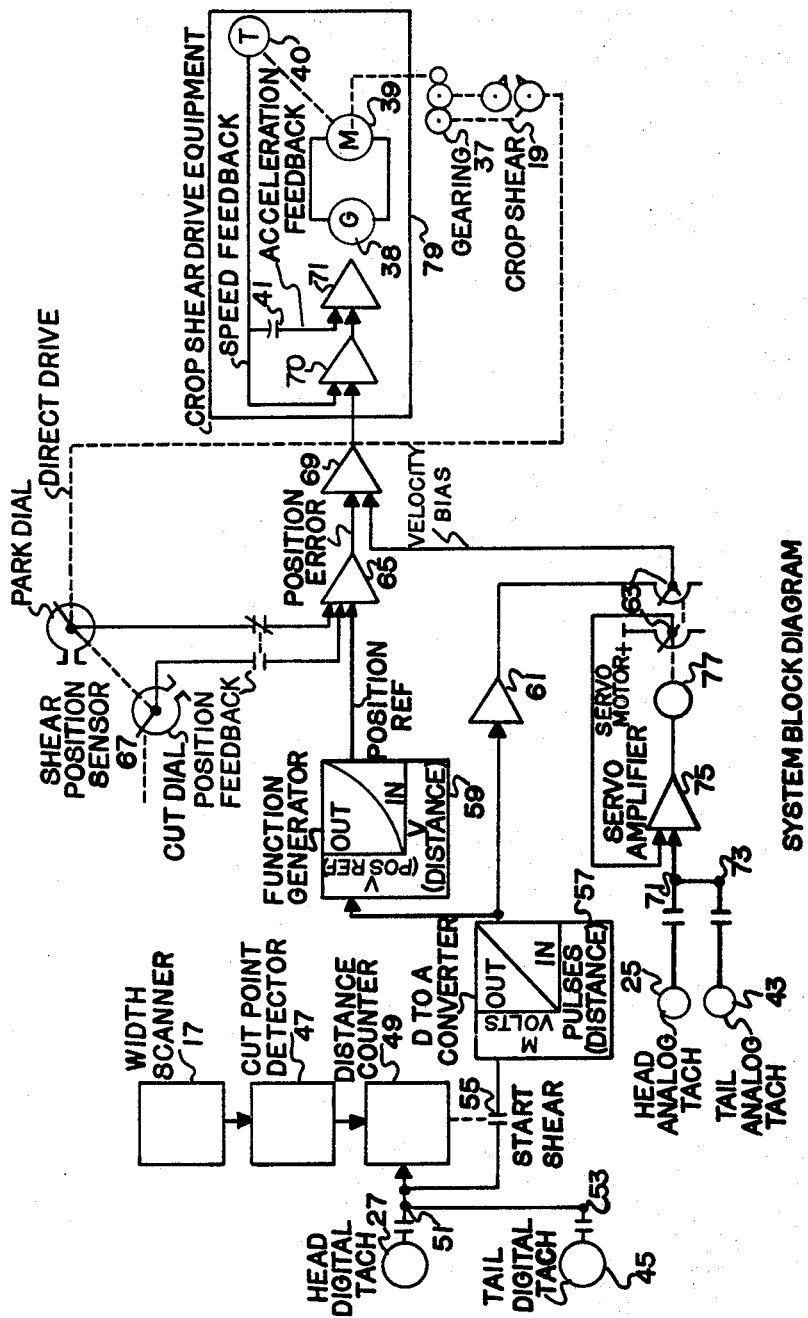

United States Patent Office 3,386,321
Patented June 4, 1968

3,386,321
AUTOMATIC CONTROL SYSTEM FOR HOT
STRIP MILL CROP SHEAR
Hugh S. Maxwell, Schenectady, N.Y., assignor to General
Electric Company, a corporation of New York
Filed Apr. 22, 1965, Ser. No. 450,083
7 Claims. (Cl. 83—295)

This invention is directed to a hot strip mill, and more particularly to a crop shear for a hot strip mill located in the conventional position between roughing stand, or stands, and finishing stands for cropping the ends of steel plates prior to passage through the finishing stands.

When hot steel slabs are rolled to plates in the roughing stand, or stands, the head and tail end of the plates become deformed as shown in FIGURE 1.

To square the ends and produce a nearly rectangular shaped plate, the deformed ends are removed by a crop shear as shown by the dotted lines in FIGURE 1. The shear is a conventional device with two cylindrical drums with one cutting blade each, which make one revolution for each cut and stop in a predetermined "park" position with blades parted between cuts.

The prime product is described as nearly rectangular because some shears are designed to shear along an arc and also because strip edges are not necessarily completely straight or parallel.

In accordance with this invention, the head and tail end crops should be as short as possible to maximize the length of prime material in the plate delivered from the shear to the finishing stands for rolling to strip and to minimize crop loss.

Head and tail crops should not, in any case, exceed predetermined lengths approaching the maximum lengths which can be handled by crop disposal equipment.

For many past years it has been common practice to bring head and tail ends past shearing position at creeping speeds and to initiate each shearing cycle manually by visual observation of the strip head or tail by a shear operator as it approached shearing position.

Such factors as impossibility of good view, lack of mechanical measurement, variation in human reaction time, and variation in judgment required that both front and tail crops be cut conservatively long, reducing prime product and risking disposal problems. Occasional errors in head end cropping would result in leading edges either not cropped or cropped on a line much less than full width with resultant risk of unsuccessful threading into finishing stands. Failure of the plate (strip) to enter any stand results in a "cobble" with resulting mill delay, loss of the cobbled strip, possible loss of immediately following plates if they become too cold for rolling, and possible roll damage.

In recent years some crop shears have been equipped with systems to initiate shear cycles automatically to crop head and tail ends to predetermined lengths. Such systems do not insure cropping of all non-prime product such as narrow head ends or "fishtail" tail ends.

Such systems also do not provide consistent cutting along the selected lines within close tolerances, such as 0.5 inch, at plate speeds such as 240 feet per minute, as provided by the new and improved system described herein.

A object of this invention is to provide a new and improved automatic control system for cropping the front ends of plates to facilitate their threading into the stands of a hot strip finishing mill.

An object of this invention is to provide a new and improved automatic control system for cropping the tail ends of plates to eliminate "fishtail" ends.

An object of this invention is to provide an automatic control system for cropping head and tail ends of plates at predetermined shear lines.

An object of this invention is to provide an automatic control system for cropping head and tail ends of plates at shear lines determined by differences in width of plate as measured along parallel transverse lines of predetermined spacing.

An object of this invention is to cause shear acceleration to be nearly constant from instant of start to instant of engagement of shear blades and plate.

An object of this invention is to cause the shear acceleration to be limited to a preset maximum.

An object of this invention is to provide a preselected peripheral speed of the shear blades at the instant of engagement with the plate.

An object of this invention is to cause the position of the shear blades during each instant while accelerating to be regulated with respect to the position that would exist with constant acceleration.

An object of this invention is to cause the shear blades, following a cut, to continue in the same direction and come to rest after one complete revolution at a "park" position, within close tolerance, under position regulation.

An object of this invention is to automatically adjust position regulator gain as a function of shear position to obtain high acceleration and deceleration in combination with high positioning accuracy upon reaching "park" position.

An object of this invention is to position regulate the shear while in "park" position to make the park position independent of shear friction and mechanical devices such as brakes.

Accordingly, the crop line is determined as the end passes beneath the crop shear detector positioned along the entry tables preceding the crop shear. A counter then starts to count as the physically unmarked crop line travels forward and continues to count until the crop line reaches a position in space at which the shear should start to accelerate.

At this instant the shear is caused to have nearly uniform acceleration, increasing velocity until shear blades match or nearly match plate velocity at the moment of engagement.

As an adjustable voltage D-C system operates at nearly constant current during acceleration of a nearly pure inertia load, the shear motor is caused to approach a reasonable limit of line current during nearly constant acceleration of the shear, thereby causing a linear increase in shear velocity and an approach to minimum elapsed time from start to engagement.

The invention is set forth with particularity in the appended claims. The principles and characteristics of the invention, as well as other objects and advantages, are revealed and discussed through the medium of the illustrative embodiments appearing in the specification and drawings which follow.

In the drawings:

FIGURE 2 shows a diagram of a hot strip mill.

FIGURE 3 shows the block diagram for the control of crop shear.

Figure 1:
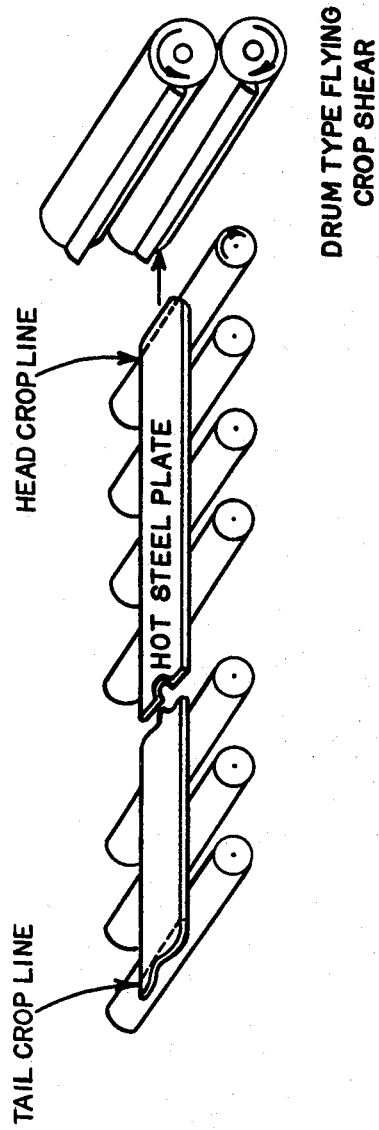
FIGURE 1 shows a view of a hot steel plate approaching a crop shear.

Referring now to FIGURE 2, a plate travels from the last roughing stand 11, over a measuring roll 15, under a hot metal detector 12, under a width scanner 17, through the crop shear 19, a second measuring roll 21, to the first finishing stand 23. The last roughing stand and first finishing stand are conventional.

The measuring roll 15 is driven by frictional contact with the traveling plate and through a gear 23 drives a digital tachometer 27 and an analog tachometer 25. The digital tachometer 27 produces a series of pulses, each pulse equivalent to a unit length of plate passing over the measuring roll 15. The analog tachometer produces a voltage proportional to the velocity of the plate passing over the measuring roll 15.

The hot metal detector 12 actuates a contact closure in response to radiated energy from the hot strip, to discriminate between the presence and absence of strip at this position for selection of front end or tail end shearing. Hot meal detectors in hot mills are in themselves well known in the art.

The width scanner 17 scans the width of the slab along three transverse lines, scans A, B and C. Each scan line is approximately 30 inches apart. The width scanner 17 is a form of non-contact width gage. Width gages which measure the widths of plates and strips in hot mills are in themselves well known in the art. A width scanner of suitable type, known in the trade as non-contact crop shear detector, is decribed in U.S. Patent 3,033,991.

The scanner described in Patent 3,033,991 employs additional scans D and E which can provide the recognition function of hot metal detector 12, but these scans are not essential to the invention.

The crop shear 19 consists of two drums 29 and 31, each with a blade 33 and 35 on the drum. The drums are driven in synchronism through gears 37 by a drive motor 39 so that blades 33 and 35 engage the top side and under said of the plate simultaneously when cropping an end. The crop shear starts from a "park" position shown in FIGURE 2. "Park" position is an exact starting position wherein the blades are outside the cutting zone to permit passage of plate between drums. A typical "park" position places blades 270° ahead of, and thus 90° beyond the vertical centerline position which exists at the moment of maximum blade engagement and completion of a crop.

Measuring roll 21 is rotated by frictional contact with the plate as it travels to and through the crop shear on the motor driven roll tables. Measuring roll 21 drives digital tachometer 45 and analog tachometer 43. The digital tachometer produces a pulse for each predetermined small increment of plate length as the plate passes over the measuring roll 21. Starting at a count of zero when a crop line passes the roll, the accumulated pulse count is thus at each instant proportional to the distance of advance of the crop line byond measuring roll. Meanwhile the analog tachometer produces a voltage at each instant proportional to the velocity of the plate. The digital and analog tachometers are well known.

In FIGURE 3 the width scanner 17 is the same scanner shown in FIGURE 2. When the head end or front end of the plate is passing under the scanner 17, the widths of the plate along scans A and B are continually measured by scanner 17 and compared by cut point detector 47, which emits a signal when the differential in width between scans A and B decreases to a preset value. At this instant the transverse line passing scan B becomes identified as the front crop line.

Similarly, as the tail end of the plate travels under the scanner 17, the widths of the plate along scans B and C are continually measured by scanner 17 and compared by cut point detector 47 which emits a signal when the differential in width between scans B and C increases to a preset value. At this instant the transverse line passing scan B becomes identified as the tail crop line.

In case a "fishtail" exists, the sudden absence of metal toward plate centerline as the "fishtail" begins to pass under scan B causes an immediate increase in the differential and thus causes a line tangent to the root of the "fishtail" to become identified as the tail crop line.

The signal from cut point detector 47 is applied to a preset distance counter 49 to gate that counter.

Preset distance counter 49 is set to a preset count corresponding to the distance that the crop line of the plate must travel from its position under the B scan of the scanner at the instant the gating signal occurs to its position at a later instant when the crop shear must start.

This start shear position 18 is a predeterminable position along the path of travel between scanner and shear. It is a position which precedes the plate position at the instant of blade engagement by a distance equal to twice the length of the arc of travel of a shear blade between start and engagement positions. Adjustment of the preset count accommodates minor shifts in the position of engagement caused by change in plate thickness or radius of cutting edge of blades.

Pulses are applied to the preset distance counter 49 on terminal 51 from the head end digital tachometer 27 as the head crop line advances toward the start shear position and on terminal 53 from the tail end digital tachometer 45 as the tail crop line advances toward the start shear position.

Each pulse received reduces the preset count by a count of one. At the instant counter 49 has counted down to zero, the instant when the crop shear line has advanced to the start shear position, counter 49 closes contact 55 gating the pulses thenceforth to digital to analog converter 57. This is a straightforward converter which produces an analog voltage output directly proportional to the number of pulses received, and thus proportional to crop line position measured from start shear position as it travels beyond the start shear position.

The voltage from converter 57 is applied to a function generator 59.

For either constant or varying plate velocity the pulses into digital to analog converter 57 produce a voltage which increases linearly with distance of plate travel. Function generator 59 converts this linear variation into a multilinear voltage variation approaching a half-parabola, this also with respect to distance of plate travel, as shown in the block 59 representing the function generator in FIGURE 3.

The output of function generator 59 is the position reference for a position regulator which regulates the angular position of the blades of crop shear 19 during the interval from start to engagement of the blades with the plate.

The output voltage of function generator 59 is applied to amplifier 65. A shear position sensor 67 senses the rotational position of the crop shear and applies a position feedback signal to amplifier 65. The difference of reference and feedback signals is amplified and applied as a position error signal to amplifier 69.

A basic concept of this invention is position regulation of the actual rotational position of the shear blades at each instant between start and engagement using a reference proportional to the ideal instantaneous position of the blades as determined by the instantaneous position of the crop line of the plate as the plate advances to or through the shear.

Accordingly, the position regulation does not require that the plate travel at constant velocity. Variations in plate velocity will result in corresponding variations in shear acceleration to maintain the same position relationships between shear blades and the advancing crop line.

A voltage signal from the head analog tachometer 25 is applied to terminal 71 as the plate continues to pass over measuring roll 15 after distance counter 49 has counted down to zero for head end count.

The analog signal from the tail analog tachometer 43 is applied to terminal 71 as the plate continues to pass over measuring roll 21 after distance counter 49 has again counted down to zero for tail end count.

The analog signal from the head analog tachometer 25 or the tail analog tachometer 43 is applied to servo amplifier 75. This servo amplifier 75 operates servo motor 77, moving the sliders of tandem potentiometer 63.

The output of the slider of one dial of potentiometer 63 fed from a fixed voltage source is fed back to the servo amplifier 75 to obtain servo action in the conventional manner. The sliders of both potentiometer dials, are accordingly driven to a position proportional to tachometer voltage and thus strip speed.

The linearly increasing voltage from converter 57 which was applied to the function generator 59 as heretofore described is also applied to amplifier 61. The linearly increasing output of amplifier 61 is proportional to the distance of plate travel beyond start shear position and accordingly proportional to shear blade velocity in per unit of final velocity. This voltage is applied to a dial of potentiometer 63.

Since the slider position of tandem potentiometer 63 is proportional to plate velocity as heretofore described, potentiometer 63 serves as a multiplier. The slider output, applied to amplifier 69, is proportional to ideal blade velocity and is designated velocity bias.

For example, if the plate has traveled 65% of the distance from shear start to shear cut position, the ideal blade velocity at that instant will be 0.65×plate velocity, where "0.65" is the applied voltage and "plate velocity" is slider position of potentiometer 63.

This velocity bias input and the position error input are summed and amplified by amplifier 69.

The output of amplifier 69 is applied to amplifier 70 of crop shear drive equipment 79 as a combined reference for both speed and position regulation, which, through conventional adjustable voltage D-C drive not shown in FIGURE 3, causes the motor 39 to drive the shear toward crop position.

A D-C signal from D-C tachometer 40, driven by the shear motor, provides a feedback to amplifier 70 proportional to actual blade velocity, the feedback of the speed regulator. That portion of the output of amplifier 69, real or cancelled, caused by the velocity bias input is the reference of the speed regulator.

Whereas the crop shear drive equipment is indicated diagrammatically to contain a generator 38, other forms of adjustable voltage supply such as controlled rectifiers, are applicable.

Tachometer 40 is a conventional D-C tachometer. Alternatively, it may be a potentiometer dial supplied from constant voltage such as a dial of shear position sensor 67 with slider output connected through a capacitor to amplifier 70. This also provides a signal proportional to rate of change of position, which is a velocity feedback.

Shearing is completed when the shear blades of the two drums reach full engagement at dead center position, on the centerplane between drum axes.

At this instant a shear driven switch transfers the position reference signal to amplifier 65 from the function generator to a fixed supply voltage equal to the slider voltage of a shear position sensor potentiometer park dial when in park position and transfers position feedback to the park dial.

Accordingly, following the shearing action the drums decelerate and stop with blades in park position under position regulator control. Gain changing resistors are inserted as a function of shear position at dead center to obtain deceleration in response to a large position error signal without excessive armature current. Gain changing resistors are also inserted as the shear blades approach "park" position to obtain high positioning accuracy at rest and minimum or zero oscillation when coming to rest.

The output voltage of amplifier 70 is limited by diode circuits in a conventional manner so that the output signal of amplifier 70 is held to a preset maximum value in case large position or speed errors should otherwise cause greater output.

This limited output is applied to amplifier 71 as the reference for an acceleration regulator. The output of tachometer 40 is differentiated by capacitor 41 to obtain rate of change of speed and thus provide acceleration feedback. Accordingly, the shear acceleration is limited to a preset maximum to avoid excessive armature current, which is approximately directly proportional to acceleration as a rotary drum shear load is primarily an inertia load having low friction.

Neither time measurement nor constant plate velocity is implicit in the shear position regulator and a novelty of the invention is that it is independent of both.

For purpose of illustration of how shear blade velocity may be made greater or less than plate velocity at the instant of engagement, when desired, it is convenient to examine three cases of constant plate velocity: (1) equal, (2) 110% and (3) 90% blade velocity. Faster blade velocity is optional for head crops and slower blade velocity is optional for tail crops for the purpose of causing greater physical separation of crops from cropped plate after shearing, to facilitate removal via crop chute.

For equal plate and blade velocity the preset number in distance counter 49 is preset to produce a start shear signal when the crop line reaches a position exactly twice the blade arc from engagement position. This position is required because with constant acceleration from zero to plate velocity the average blade velocity will be exactly one half plate velocity.

For 1.1×case one blade velocity, the preset distance counter 49 is preset to a higher number to produce a start shear signal when the crop line reaches a more advanced position less than twice the blade arc. The plate position for shear start will be (2/1.1)×shear arc away from engagement position.

Accordingly, the gain of the digital to analog converter is increased to 1.1×case one value to cause function generator 59 to reach the same output when (1/1.1)×case one quantity of pulses have occurred. Also the slope of the speed regulator reference (velocity bias) is increased to 1.1×case one value for the same tachometer voltage. One means of increasing this reference is reduction of the applied voltage across the servo dial of potentiometer 63 to (1/1.10)×case one value.

With adjustments cited the constant acceleration will be $(1.1)^2$×case one acceleration, the shear accelerating to 1.1×case one blade velocity in (1/1.1)×case one elapsed time, if the acceleration limit circuit is not caused to limit acceleration.

For 90% case one blade velocity the preset distance counter 49 is preset to a lower number for shear start at a plate position of (2/.9)×shear arc away from engagement position, the gain of the digital to analog converter is decreased to .9×case one value, and the velocity bias is decreased to .9×case one value. Resulting constant acceleration will be $(.9)^2$×case one acceleration.

As described, by preadjustment of circuit value at the instant of engagement with the preselected crop line, the shear blades may have a preselected speed either equal to plate speed, greater than plate speed, or less than plate speed.

While the invention has been explained and described with the aid of particular embodiments thereof, it will be understood that the invention is not limited thereby and that many modifications retaining and utilizing the spirit thereof without departing essentially therefrom will occur to those skilled in the art in applying the invention to specific operating environments and conditions. It is therefore contemplated by the appended claims to cover all

What is claimed is:

1. A crop shear for shearing plates at a crop line in a hot strip mill comprising, a shear having shear blades for shearing plates, said shear having a park position at which the shear blades are a predetermined arc from engagement with said plates, a start shear position a first predetermined distance from said shear which is approximately twice the length of said arc of travel of said shear blades between said park position and engagement with said plates, means for selecting a crop line on said plates a second predetermined distance from said shear, means for indicating the travel of the crop line from said selecting means to said start shear position, and means responsive to said indicating means for accelerating said shear when said crop line reaches said start shear position to shear said plates at said crop line.

2. A crop shear for shearing plates at a crop line in a hot strip mill comprising, a shear having shear blades for shearing plates, said shear having a park position at which the shear blades are a predetermined arc from engagement with said plates, a start shear position a first predetermined distance from said shear which is approximately twice the length of said arc of travel of said shear blades between said park position and engagement with said plates, means for selecting a crop line on said plates a second predetermined distance from said shear, counting means adapted to indicate when crop line of a plate reaches said start shear position, and means responsive to said counting means for accelerating said shear to shear said plates at the crop line.

3. A crop shear for shearing plates at a crop line in a hot strip mill comprising, a shear having shear blades for shearing plates, said shear having a park position at which the shear blades are a predetermined arc from engagement with said plates, a start shear position a first predetermined distance from said shear which is approximately twice the length of said arc of travel of said shear blades between said park position and engagement with said plates, means for selecting a crop line on said plates a second predetermined distance from said shear, a counter preset to indicate when a count indicating the distance between said first and second predetermined distances is counted, means responsive to the movement of the crop line on a plate towards said shear for applying pulses to said counter indicating the movement of the crop line, and means responsive to said counter for accelerating said shear to shear said plates at the crop line when said counter indicates that the crop line has reached said start shear position.

4. A crop shear for shearing plates at a crop line in a hot strip mill comprising, a shear having shear blades for shearing plates, said shear having a park position at which the shear blades are a predetermined arc from engagement with said plates, a start shear position a first predetermined distance from said shear which is approximately twice the length of said arc of travel of said shear blades between said park position and engagement with said plates, means for selecting a crop line on said plates a second predetermined distance from said shear, a counter preset to indicate a count indicating the distance between said first and second predetermined distances, means responsive to the movement of the crop line on a plate towards said shear for applying pulses to said counter indicating the movement of the crop line, means responsive to said counter to produce a position reference when said counter indicates that the crop line has reached said start shear position, and means responsive to said position reference to control said shear for shearing plates at said crop line.

5. A crop shear for shearing plates at a crop line in a hot strip mill comprising, a shear having shear blades for shearing plates, means for selecting a crop line on said plates, means for producing a position reference for said shear as said crop line approaches said shear, means for producing velocity bias to indicate ideal blade velocity at any one instant of time as said crop line approaches said shear, and means responsive to said velocity bias and said position reference for controlling said shear to shear said plates at said crop line.

6. A crop shear for shearing plates at a crop line in a hot strip mill comprising, a shear having shear blades for shearing plates, said shear having a park position at which the shear blades are a predetermined arc from engagement with said plates, a start shear position a first predetermined distance from said shear which is approximately twice the length of said arc of travel of said shear blades between said park position and engagement with said plates, means for selecting a crop line on said plates a second predetermined distance from said shear, a counter preset to indicate a count indicating the distance between said first and second predetermined distances, means responsive to the movement of the crop line on a plate towards said shear for applying pulses to said counter indicating the movement of the crop line, means responsive to the movement of the crop line on a plate and to said counter indicating that the crop line has reached the start shear position for producing a position reference for said crop shear, means responsive to said counter indicating that the crop line has reached the start shear position and to the movement of the crop line on a plate for indicating the speed of the crop line, means responsive to the movement of the crop line past said start shear position for providing an indication of movement of the crop line past said start shear position, means responsive to said speed indication and said crop line movement indication for providing a speed reference, and means responsive to said speed reference and said position reference for controlling said shear to shear said plates at said crop line.

7. A crop shear for shearing plates at a crop line in a hot strip mill comprising, a shear having shear blades for shearing plates, said shear having a park position at which the shear blades are a predetermined arc from engagement with said plates, a start shear position a first predetermined distance from said shear which is approximately twice the length of said arc of travel of said shear blades between said park position and engagement with said plates, means for selecting a crop line on said plates a second predetermined distance from said shear, a counter preset to indicate a count indicating the distance between said first and second predetermined distances, means responsive to the movement of the crop line on a plate towards said shear for producing pulses indicating the movement of the crop line, means for applying the pulses from said pulse producting means to said counter means so that said counting means indicates when the crop line reaches the start shear position, a digital to analog converter for producing an analog output signal proportional to the pulses applied thereto, means for applying the pulses from said pulse producing means to said digital to analog converter after said crop line reaches said start shear position so that said digital to analog converter producing an analog signal indicating the movement of the crop line towards said shear, a function generator responsive to the analog output signal from said digital to analog converter for producing a position reference, means for providing a position feedback indicating the position of the shear blades of said shear, means for comparing said position reference and said position feedback to provide a position error, means responsive to the movement of said plate for indicating the speed of the plate and the crop line thereon, means responsive to said speed indication and said analog output signal from said digital to analog converter for providing a speed reference, and means responsive to said speed reference and said position error for controlling said shear to shear said plates at said crop line.

(References on following page)

References Cited

UNITED STATES PATENTS

| | | | |
|---|---|---|---|
| 1,959,851 | 5/1934 | Biggert | 83—289 |
| 2,070,537 | 2/1937 | Matthews | 83—288 |
| 3,082,368 | 3/1963 | Rowe | 83—364 |
| 3,149,520 | 9/1964 | Fish et al. | 83—288 |
| 3,181,403 | 5/1965 | Sterns et al. | 83—76 |
| 3,195,385 | 7/1965 | Paterson | 83—76 |
| 2,716,450 | 8/1955 | Nicholson | 83—295 X |

FOREIGN PATENTS 102,758  10/1962  Netherlands.

ANDREW R. JUHASZ, *Primary Examiner.*

WILLIAM W. DYER, JR., *Examiner.*

L. TAYLOR, *Assistant Examiner.*